United States Patent [19]

Takahashi

[11] 3,909,840

[45] Sept. 30, 1975

[54] MULTI-COLOR DATA PROCESSING METHOD

[75] Inventor: Masaaki Takahashi, Tokyo, Japan

[73] Assignee: n a c Incorporated, Tokyo, Japan

[22] Filed: Nov. 12, 1973

[21] Appl. No.: 415,001

[30] Foreign Application Priority Data

Mar. 20, 1973 Japan.............................. 48-31406

[52] U.S. Cl. .................................................. 358/81
[51] Int. Cl.² ........................................... H04N 9/09
[58] Field of Search ....................................... 358/81

[56] References Cited
UNITED STATES PATENTS

| | | | |
|---|---|---|---|
| 3,193,838 | 7/1965 | Mithcell, Jr. ...................... | 358/81 X |
| 3,612,755 | 10/1971 | Tadlock ........................... | 178/5.2 R |
| 3,811,113 | 5/1974 | Saito et al. ....................... | 340/172.5 |

Primary Examiner—Richard Murray
Assistant Examiner—Aristotelis M. Psitos
Attorney, Agent, or Firm—Stevens, Davis, Miller & Mosher

[57] ABSTRACT

A plurality of images photographed from the same object using a corresponding number of filters each having a light pass band different from one another are converted into television video signals of tri-color R, G and B having intensities or brightnesses corresponding to the densities of the images and subsequently these video signals are synthesized and displayed on a color monitor television. By eliminating selectively R, G and B level signals corresponding to the densities of the images from the synthesized color video signal, the density of the object in interest photographed in the images as well as the occupying area thereof can be determined merely by observing the change in color of the image displayed on the monitor device.

2 Claims, 3 Drawing Figures

MULTI-COLOR DATA PROCESSING METHOD

BACKGROUND OF THE INVENTION

The present invention relates to a method of processing photographed color images to obtain desired information or data therefrom.

In case of photographing or photographically mapping the earth ground conditions from an airplane, a single camera head was in the past employed to take a single photograph. Lately, a novel photographing technique has been developed wherein various filters having different pass bands are used in combination with four objective camera lenses, to record the corresponding number of images of an object on a film by the radiation passing through the associated filters. To this end, a photographic film having a large size of 25 × 25 cm is divided into four rectangular sections on which different images are separately recorded through the associated filters. By virtue of the development of this type of photographing technique, it has now become possible to analyze or discriminate between portions of the photographed object, which could not be examined in case of the prior photographing technique using a single camera to take a single photograph over a whole field in view. At present, the above type of photographing method using four camera lenses each provided with a different inherent filter is gaining a great popularity and are found a variety of applications in many industrial fields. For example, in determination of the ground as well the atmospheric conditions in relation to the studies of vegetation, forestry, agriculture, geology, geography, oceanography, pollution etc., the photographs taken by the multi-camera method are utilized as useful information carriers. However, notwithstanding the improved photographing techniques, difficulties are encountered in the steps of processing such photographed images to obtain required information. In fact, the conventional operations using optical systems together with various filters to protect a plurality of superimposed images on a plane requires troublesome and time consuming labours in addition to requiring skill of the operator.

SUMMARY OF THE INVENTION

An object of the present invention is to provide a method of processing rapidly multi-color data to obtain imformation useful in the analytical studies in various fields as recited above by utilizing television technology for the analysis of the films.

According to the present invention, a plurality of images photographed from the same object using a corresponding number of filters each having a light pass band different from one another are converted into television video signals of tri-color R, G and B having intensities or brightnesses corresponding to the densities of the images and subsequently these video signals are synthesized and displayed on a color monitor television. By eliminating selectively R, G and B level signals corresponding to the densities of the images from the synthesized color video signal, the density of the object in interest photographed in the images as well as the occupying area thereof can be determined merely by observing the change in color of the image displayed on the monitor device.

The other objects, advantages and features of the invention will be made clearer from the following description of a preferred embodiment of the invention made with reference to the accompanying drawings.

DETAILED DESCRIPTION OF A PREFERRED EMBODIMENT

Figure 1:
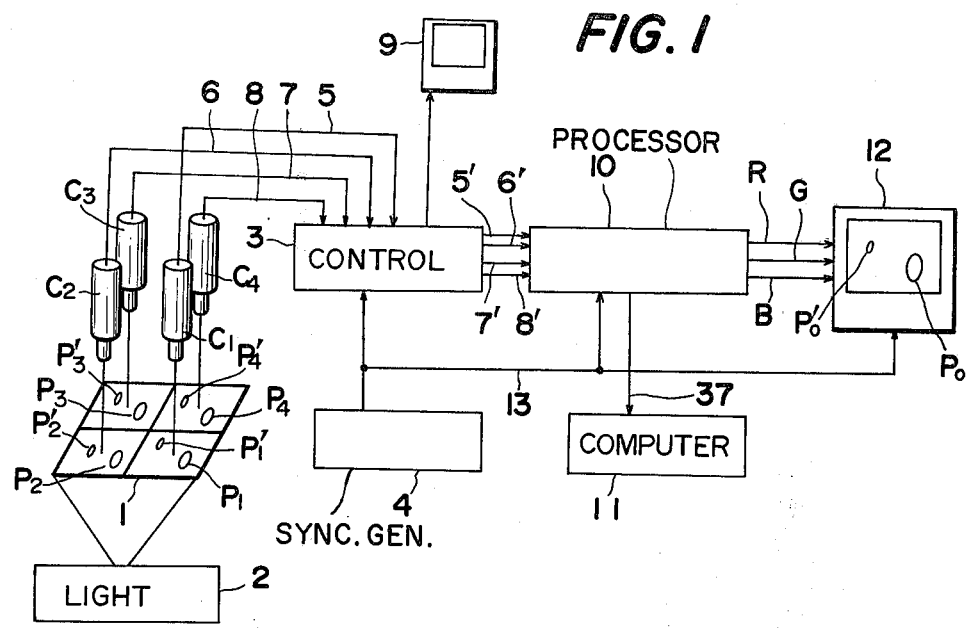
FIG. 1 is a block diagram showing in general a preferred arrangement of a system to carry out the method of this invention.

Referring to FIG. 1 which schematically shows a general arrangement of a multi-color data processor system according to the present invention, reference numeral 1 indicates a photographic film in which four pairs of images $P_1, P_1'; P_2, P_2'; P_3, P_3'$ and $P_4, P_4'$ of the same object are recorded by photographing them through respective associated filters each having a predetermined pass region of wave lengths different from one another. For the sake of convenience of description, it is assumed that the images $P_1$ and $P_1'$ have different densities. This applies to the pairs of the images $P_2, P_2'; P_3, P_3'$ and $P_4, P_4'$. Furthermore, it is assumed that all the images $P_1, P_1', P_2, P_2', P_3, P_3', P_4$ and $P_4'$ are different from one another in respect of their densities or concentrations.

The film 1 is illuminated by a light source 2 disposed there-below and the illuminated images in pairs are sensed or picked up by four television cameras or image tubes $C_1, C_2, C_3$ and $C_4$ each of which is disposed above the film 1 in opposition to the associated pairs of images. The output video signals from the television cameras $C_1, C_2, C_3$ and $C_4$ are applied to a television camera control apparatus 3 by way of respective television camera cables 5, 6, 7 and 8. The output video signals from the control apparatus 3 are then supplied to a multi-color data processor apparatus 10 through video cables 5', 6', 7' and 8' in which apparatus preselected three video signals are applied or added with color components such as red, green and blue. A black-and-white television monitor 9 is provided to monitor the images produced by the four television cameras, when required.

The output color video signals R, G and B from the multi-color processor 10 which are now colored in red, green and blue are then fed to a color television monitor 12 to be displayed. Three types of video signals applied to the color monitor 12 are the ones arbitrarily selected from the outputs of four television cameras $C_1, C_2, C_3$ and $C_4$. Four kinds of combinations of those output video signals are therefore conceivable for use. A synchronous signal generator 4 is provided to produce a signal utilized for timing the operations of various components in the system as indicated by line 13. Reference symbols $P_o, P_o'$ on the color monitor 12 represent, respectively, synthesized images of $P_1, P_2$ and $P_3$ and $P_1', P_2'$ and $P_3'$. A line printer or an electronic computor 11 is used as a unit to process or analyze the various data produced in a manner as hereinafter described.

Figure 2:
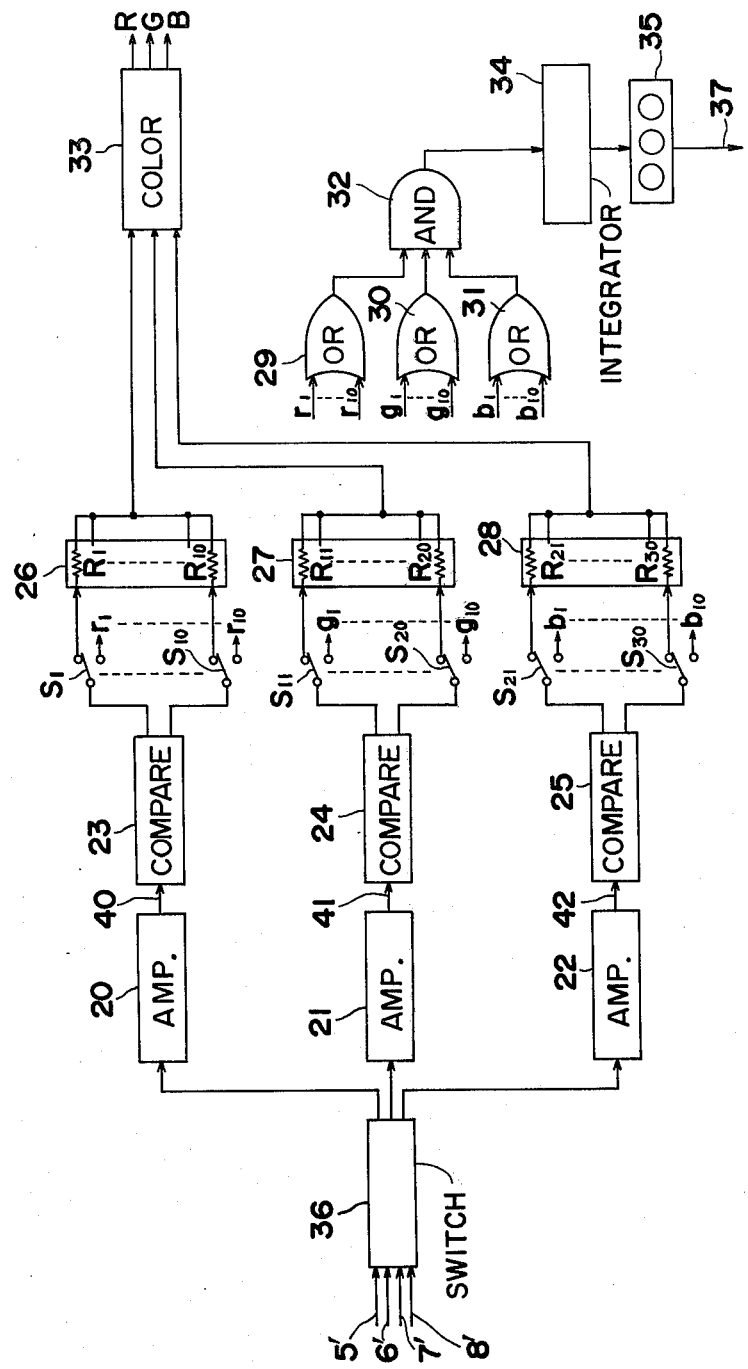
FIG. 2 is a circuit diagram showing in same detail a preferred embodiment of a multi-color data processing apparatus according to the invention.

FIG. 2 is a principal block diagram of a multi-color data processor 10 suitable for accomplishing the intended operations of the present invention.

Referring to FIG. 2, reference numeral 36 indicates a video signal switch which is adapted to receive four video signals from the cables 5', 6', 7' and 8' shown in FIG. 1 and used to select arbitrarily three video signals therefrom to apply them to the inputs of video signal amplifiers 20, 21 and 22 which incorporate therein respective log amplifiers (not shown). The output signals from the video signal amplifiers 20, 21 and 22 are applied to associated level comparators 23, 24 and 25 through respective video signal transmission lines 40, 41 and 42. Each of those comparators 23, 24 and 25 has ten discrete predetermined reference levels with which the amplitudes of the incoming video signals are compared to determine at which level each of the amplitudes of the input signals lies. The comparators 23, 24 and 25 have respective sets of switches $S_1$ to $S_{10}$, $S_{11}$ to $S_{20}$ and $S_{21}$ to $S_{30}$, each one of those switches corresponds to each of the above ten discrete reference levels. The video signals which have thus been determined in respect of the levels of the amplitudes by the comparators 23, 24 and 25 are then input into respective resistor matrix circuits 26, 27 and 28 by means of the switches selected from the associated groups 26, 27 and 28 in accordance with the determined levels of the input video signals. In this case, only three video signals are utilized and it is assumed that they are from the television cameras $C_1$, $C_2$ and $C_3$, respectively. Thus, the video signal 5' from the television camera $C_1$ is applied to the comparator circuit or level discriminator 23, the video signal from the camera $C_2$ is applied to the comparator 24 and the signal derived from the camera $C_3$ is applied to the amplitude level discriminator 25.

Figure 3:
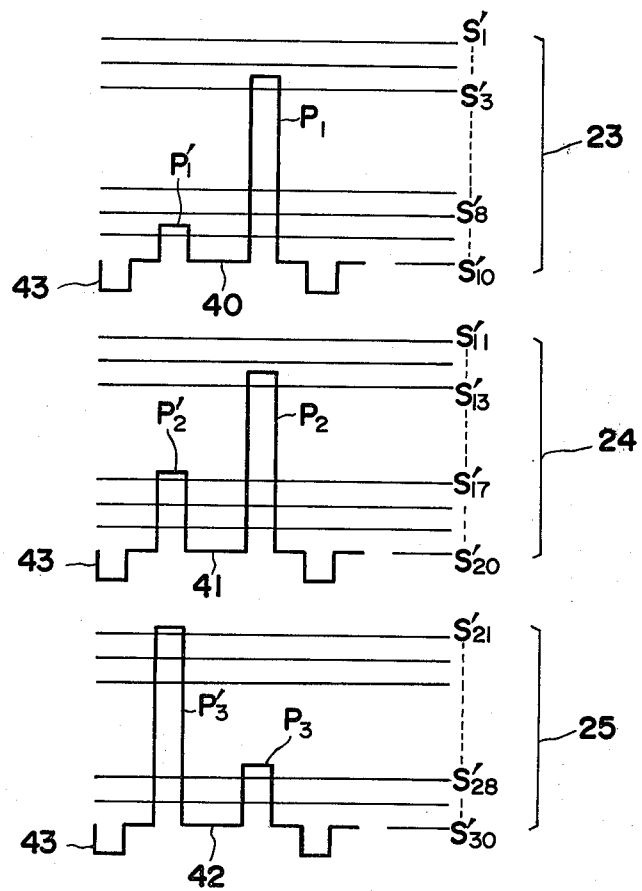
FIG. 3 is a graph showing wave forms of video signals to illustrate a so-called analog to digital conversion of them.

FIG. 3 graphically shows relationships between the amplitudes of the input video signals to the comparators 23, 24 and 25 and the discrete reference levels set in the respective comparators. In FIG. 3, reference numerals 40, 41 and 42 indicate wave forms of the video signals from the television camera $C_1$, $C_2$ and $C_3$ as produced by sensing the photographed images $P_1$, $P_1'$, $P_2$, $P_2'$ and $P_3$, $P_3'$. Since those images are assumed to have different densities, the signals 40, 41, 42 have correspondingly different amplitudes as indicated by $P_1$, $P_1'$, $P_2$, $P_2'$, $P_3$ and $P_3'$. It is to be noted that the generation of these wave forms of video signals 40, 41 and 42 are triggered with a vertical synchronizing signal frequency. Reference numeral 43 represents a vertical flyback line signal.

The amplitudes ($P_1'$, $P_1$) of the video signal 40 correspond to certain ones of the ten graded reference levels $S_1'$ to $S_{10}'$ of the level discriminator or comparator 23. In a similar manner, the video signal 41 has amplitudes ($P_2'$, $P_2$) coinciding with the selected ones of ten reference levels $S_{11}'$ to $S_{20}'$ set in the comparator 24. The amplitudes ($P_3'$, $P_3$) of the video signal 42 are at ones of the ten discrete levels $S_{21}'$ to $S_{30}'$ of the comparator 25. It shall be appreciated that the reference levels $S_1'$ to $S_{30}'$ are associated with the switches $S_1$ to $S_{30}$, respectively. Accordingly, the signal component $P_1$ of the video signal 40 appears at the level $S_3'$ or switch $S_3$, while $P_1'$ appears at the level $S_9'$ or the switch $S_9$. The signal wave portion $P_2$ of the video signal 41 will be produced at the switch $S_{13}$ corresponding to the level $S_{13}'$ with $P_2'$ appearing at the switch $S_{17}$ or level $S_{17}'$. The signal wave portions $P_3$ and $P_3'$ of the video signal 42 will appear at the switches $S_{28}$ and $S_{21}$ corresponding to the levels $S_{28}'$ and $S_{21}'$, respectively.

In the circuit arrangement shown in FIG. 2, the output from the comparator 23 divided into discrete levels in a so-called digital manner is connected to a red channel of a color signal output circuit 33 by way of resistor or color matrix circuit 26, while the outputs R, G and B of the circuit 33 in turn are connected to a conventional color television monitor 12. Accordingly, the video signal 40 is applied to the red channel input of the monitor 12, the grade or brightness of which may be varied within the range of 10 levels from dark to bright red in accordance with the output levels of the comparator 23 as appearing at the associated switches selected from the group composed of $S_1$ to $S_{10}$. In the illustrated embodiment, the image displayed in red at the monitor 12 becomes brighter, as the input connection to the color signal output circuit 40 is shifted from the switches $S_{10}$ to $S_1$ with the values of resistors $R_1$ to $R_{10}$ selected so as to be $R_1 < R_2 < \ldots < R_{10}$. In a similar manner, the amplitudes of the video signal 41 are discriminated by the comparator 24 with reference to ten levels and applied to the green channel of the color output circuit 33 so that the images in green displayed on the color monitor 12 may have brightness levels selected from the ten grade numbers of green colors in correspondence to the amplitude levels appearing at selected switches from $S_{11}$ to $S_{20}$. In this case, the values of resistances $R_{11}$ to $R_{20}$ are so preselected that the images in green will become brighter as the input to the circuit 33 is shifted from the switches $S_{20}$ to $S_{11}$. The same connecting or circuit arrangement is also employed for the output signals from the comparator 25, which signals are applied through associated resistances $R_{21}$ to $R_{30}$ to the blue channel of the color output circuit 33 to be displayed at the color monitor 12 with the brightness corresponding to the levels determined by the comparator 25. It is appreciated that the resistances $R_1$ to $R_{10}$ compose the resistance matrix circuit 26, while the other groups of resistros $R_{11}$ to $R_{20}$ and $R_{21}$ to $R_{30}$ constitute resistance matrix circuits 27 and 28, respectively. Reference characters R, G and B at the output side of the circuit 33 of course, represent the output color channels which are connected to the color television monitor 12.

Now considering the colored image of $P_o$ displayed on the color monitor 12 produced and synthesized from the images $P_1$, $P_2$ and $P_3$ on the film 1 having different densities on the basis of the amplitudes of the associated video signals 40, 41 and 42, the synthesized color image $P_1$ on the monitor 12 will become yellow slightly mixed by blue, since the image $P_1$ in red is at a relatively high level $S_3'$, $P_2$ in green is also high at the level $S_{13}'$ and $P_3$ in blue is at the lower level $S_{28}'$, as can be seen from FIG. 3.

In a similar way, the image $P_o'$ on the display screen of the color monitor 12 is composed of the images $P_1'$, $P_2'$ and $P_3'$ having different brightness levels as indicated in FIG. 3 and thus will have a cyan color slightly added with red.

In brief, according to the present invention, the amplitudes of the video signals produced from a plurality of the different colored images, for example three images, of the same object photographed on the film 1 are individually compared with ten predetermined reference levels to determine their color brightness levels and thereafter the three video signals may be mixed with one another to be displayed in a synthesized color on the color monitor 12.

When the groups of the switches $S_1$ to $S_{10}$, $S_{11}$ to $S_{20}$ and $S_{21}$ to $S_{30}$ are selectively switched to the lower contact positions as viewed in FIG. 2, for example in case the level discrimator switches $S_3$, $S_{13}$ and $S_{28}$ associated with the image $P_o$ as hereinbefore described with reference to FIG. 3 are selectively changed-over from the resistors $R_3$, $R_{13}$ or $R_{28}$ to other terminals $r_3$, $g_3$ or $b_8$, the color of the image $P_o$ displayed on the color monitor 12 will be varied correspondingly. By way of an example, if the switch $S_3$ is switched to the lower contact $r_3$, the red color component will disappear from the image $P_o$ on the monitor 12. If the switch 13 is additionally changed to the lower contact $g_3$, green component will be extracted from the image $P_o$. In addition, when the position of the switch $S_{28}$ is changed over, the blue component is also cancelled so that the image will finally become black. In this connection, it is also possible to produce the image $P_o$ in white by reversing the polarity of the video signals 40, 41 and 42.

When the video image $P_o$ becomes black, it can be understood that this image $P_o$ in black is composed of level values $S_3'$, $S_{13}'$ and $S_{28}'$ of the video signals 40, 41 and 42, respectively. The lower terminals $r_1$ to $r_{10}$ belong to the switches $S_1$ to $S_{10}$ and connected to an OR gate 29. The terminals $g_1$ to $g_{10}$ corresponding to the switches $S_{11}$ to $S_{20}$ are connected to the inputs of another OR gate 30, while the lower terminals $b_1$ to $b_{10}$ corresponding to the switches $S_{21}$ to $S_{30}$ are connected to the other OR gate 31. All the outputs of those OR gate 29, 30 and 31 are connected to an AND gate 32 which produces a pulse output having a duration corresponding to the area of the image $P_o$. Thus, by applying the output pulse from the AND gate 32 to an integrator 34 to convert the pulse width into a voltage value, the area of the image $P_o$ may be digitally displayed in a display device 35. Line 37 therefrom is connected to a line printer or computor 11 shown in FIG. 1 to be thereby further processed in accordance with the utilization purpose.

In the foregoing description, it is assumed that the images $P_1$, $P_2$ and $P_3$ constituting the image $P_o$ are identical with each other in their configurations. However, those images may usually be somewhat different from one another. In such case, the overlaying areas of those images $P_1$, $P_2$ and $P_3$ can be determined in the following manner. Namely, by setting the switch $S_3$ at the terminal $r_3$, the signal portion at the level $S_3'$ of the video signal 40 can be produced from the output of the OR gate 29. With the switch $S_{13}$ connected to the terminal $g_3$, the signal portion of the video signal 41 at the level $S_{13}'$ can be derived from the OR gate 30 as the output therefrom. When the switch $S_{28}$ is changed to the terminal $b_8$, the signal portion of the video-signal 42 having the amplitude corresponding to the level $S_{28}'$ can be obtained from the OR gate 31. Thus, by applying those OR gate outputs to an AND gate, the area of the common overlapping portion of the images $P_1$, $P_2$ and $P_3$ can be obtained as the output signal of the AND gate 32.

In a similar manner, the images $P_1'$, $P_2'$ and $P_3'$ are composed of the respective signal portions at the levels of $S_9'$, $S_{17}'$ and $S_{21}'$ and the overlapping area of those images $P_1'$, $P_2'$ and $P_3'$ can therefore be determined on the same ground as above mentioned.

The invention has been described with reference to a preferred embodiment, only by way of an example to illustrate the principle of the invention. It should, however, be apparent to those skilled in the art that many variations or modifications may be made without departing from the spirit and scope of the invention. For example, the number of the reference levels of the comparators as well as the setting positions thereof can be so changed that all the film images having densities varied in a wide range may be appropriately processed by the inventive apparatus. Furthermore, in case the film is of a single colored image, a single color camera can be used to produce R, G and B output signals for use as the video signals.

What is claimed is:

1. A method of processing multi-color data, comprising the steps of:

simultaneously sensing by means of a plurality of image tubes a plurality of images of different densities photographed separately from an object through filters having different pass bands of light wave lengths;

applying video signals arbitrarily selected from the outputs from said image tubes to respective amplitude comparators, each of said comparators having a plurality of discriminatable levels to produce red, green and blue signals each having brightness values corresponding to the amplitude values of said video signals;

displaying said signals on a color monitor; and determining the levels of said amplitude comparators to which the amplitudes of said video signals correspond, and which vary in dependence upon the densities of said images.

2. The method of claim 1 further including the steps of:

combining the outputs of said amplitude comparators to produce a pulse having a duration corresponding to the overlapping portion of said video signals; and generating a display corresponding to said overlapping portions of said video signals.

* * * * *